United States Patent
Tu

(10) Patent No.: US 7,758,183 B2
(45) Date of Patent: Jul. 20, 2010

(54) AUTOMATIC IMAGE PROCESSING APPARATUS AND SHEET FEEDING DEVICE THEREOF

(75) Inventor: Ching-Jung Tu, Hsinchu (TW)

(73) Assignee: Avision Inc. (TW)

( * ) Notice: Subject to any disclaimer, the term of this patent is extended or adjusted under 35 U.S.C. 154(b) by 46 days.

(21) Appl. No.: 12/202,974

(22) Filed: Sep. 2, 2008

(65) Prior Publication Data

US 2009/0283959 A1    Nov. 19, 2009

(30) Foreign Application Priority Data

May 19, 2008    (TW) .................................. 97118320

(51) Int. Cl.
*B65H 29/00* (2006.01)
(52) U.S. Cl. ........................ 347/108; 347/104; 400/692; 400/693
(58) Field of Classification Search ................. 347/108, 347/138, 152, 170, 222, 245, 263, 257; 358/497; 399/110, 111; 400/691, 692, 693
See application file for complete search history.

(56) References Cited

U.S. PATENT DOCUMENTS

| | | | | |
|---|---|---|---|---|
| 5,499,043 A | * | 3/1996 | Osaka | 347/108 |
| 6,827,436 B2 | * | 12/2004 | Nitta et al. | 347/108 |
| 6,982,815 B2 | * | 1/2006 | Tsutsumi | 358/474 |
| 2008/0285097 A1 | * | 11/2008 | Kitagawa et al. | 358/498 |

* cited by examiner

*Primary Examiner*—Kaitlin S Joerger

(57) ABSTRACT

An automatic image processing apparatus includes a sheet feeding device and an image processing device. The sheet feeding device supports a plurality of sheets and feeds the sheets one by one. The image processing device receives the sheets coming from the sheet feeding device one by one, and feeds and processes the sheets one by one. The sheet feeding device is removably connected to the image processing device, and receives mechanical power from the image processing device and thus feeds the sheets one by one. The sheet feeding device for the automatic image processing apparatus is also disclosed. The mechanical power for feeding the sheets is disconnected from the sheet feeding device when the sheet feeding device is removed from the image processing device.

23 Claims, 4 Drawing Sheets

AUTOMATIC IMAGE PROCESSING APPARATUS AND SHEET FEEDING DEVICE THEREOF

This application claims priority of No. 097118320 filed in Taiwan R.O.C. on May 19, 2008 under 35 USC 119, the entire content of which is hereby incorporated by reference.

BACKGROUND OF THE INVENTION

1. Field of Invention

The invention relates to an automatic image processing apparatus and a sheet feeding device, and more particularly to an automatic image processing apparatus having an image processing device and a removable sheet feeding device, and the sheet feeding device driven by the image processing device.

2. Related Art

Conventional sheet-fed scanners may be classified into two types. The first type of scanner can automatically feed multiple originals, and the second type of scanner only can automatically feed a single original. When using the first type of scanner, the user puts a stack of originals into a supplying tray of the scanner, and then the scanner feeds the originals one by one and scans the images of the originals one by one. The first type of scanner usually has the supplying tray, a sheet separation mechanism and a discharging tray, wherein the supplying tray and the discharging tray occupy a relatively large portion of the scanner, and the sheet separation mechanism needs to occupy a relatively large space. Thus, the size of the first type of scanner usually cannot be effectively reduced.

On the other hand, when using the second type of scanner, the user manually places the single original into the scanner. Because the second type of scanner needs not to be equipped with the supplying tray, the sheet separation mechanism and the discharging tray, its size can be greatly reduced. Although the second type of scanner can be easily carried by the user, it cannot automatically scan a batch of originals.

For example, the user can use the first type of scanner to scan the originals in the office. Alternatively, the user can carry the second type of scanner outdoors and use it to scan a number of originals by way of manual sheet feeding. Therefore, to achieve such purposes, the user needs to purchase two scanners, respectively, for outdoor use and for office use, while increasing the cost of apparatus used in the household or the office. The same drawback also occurs in the field of printers.

SUMMARY OF THE INVENTION

It is therefore an object of the invention to provide an automatic image processing apparatus that can be used in various occasions, and a sheet feeding device that can be combined with an image processing device.

To achieve the above-identified object, the invention provides an automatic image processing apparatus including a sheet feeding device and an image processing device. The sheet feeding device supports a plurality of sheets and feeds the sheets one by one. The image processing device receives the sheets coming from the sheet feeding device one by one, and feeds and processes the sheets one by one. The sheet feeding device is removably connected to the image processing device, and receives mechanical power from the image processing device and thus feeds the sheets one by one.

The invention also provides a sheet feeding device to be removably connected to an image processing device. The sheet feeding device includes a supplying tray, a base, a feeding mechanism and a mechanical power receiving part. The supplying tray stores a plurality of sheets. The base is formed with a first passageway connected to the supplying tray. The feeding mechanism mounted on the base feeds the sheets through the first passageway one by one. The mechanical power receiving part, disposed in the base and coupling the image processing device to the feeding mechanism, receives mechanical power from the image processing device and thus drives the feeding mechanism.

According to the automatic image processing apparatus and the sheet feeding device thereof, the user can easily combine the sheet feeding device with the image processing device, or separate the sheet feeding device from the image processing device. The image processing device can process image data (e.g., scan the image of the sheet or print data on the sheet) by way of manual sheet feeding. When the image processing device is combined with the sheet feeding device, the image processing device can quickly scan the images of a stack of sheets, which are stored in the supplying tray, by way of automatic sheet feeding. In addition, the feeding mechanism is driven by the mechanical power of the image processing device, so no motor for providing the mechanical power has to be disposed in the sheet feeding device.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
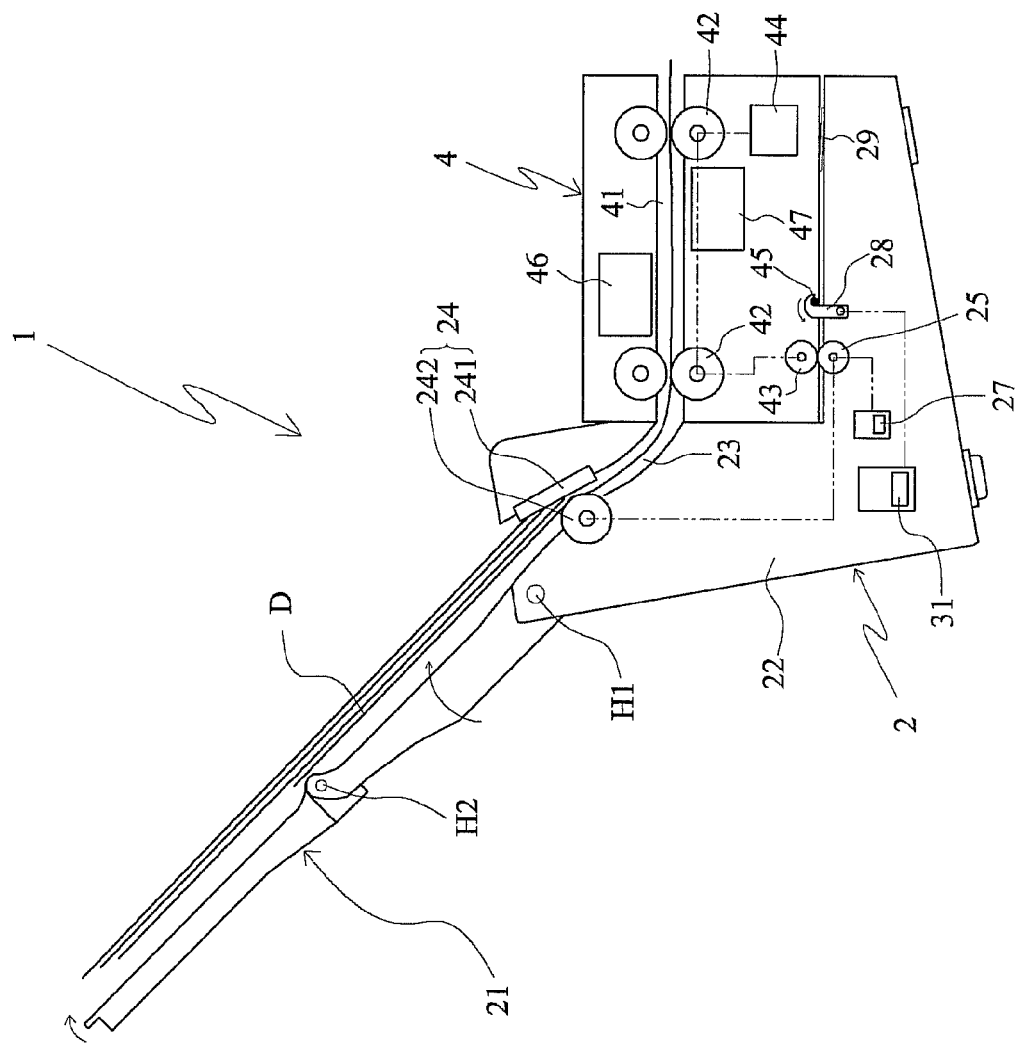
FIG. 1 is a schematic illustration showing an automatic image processing apparatus according to a first embodiment of the invention.
Figure 2:
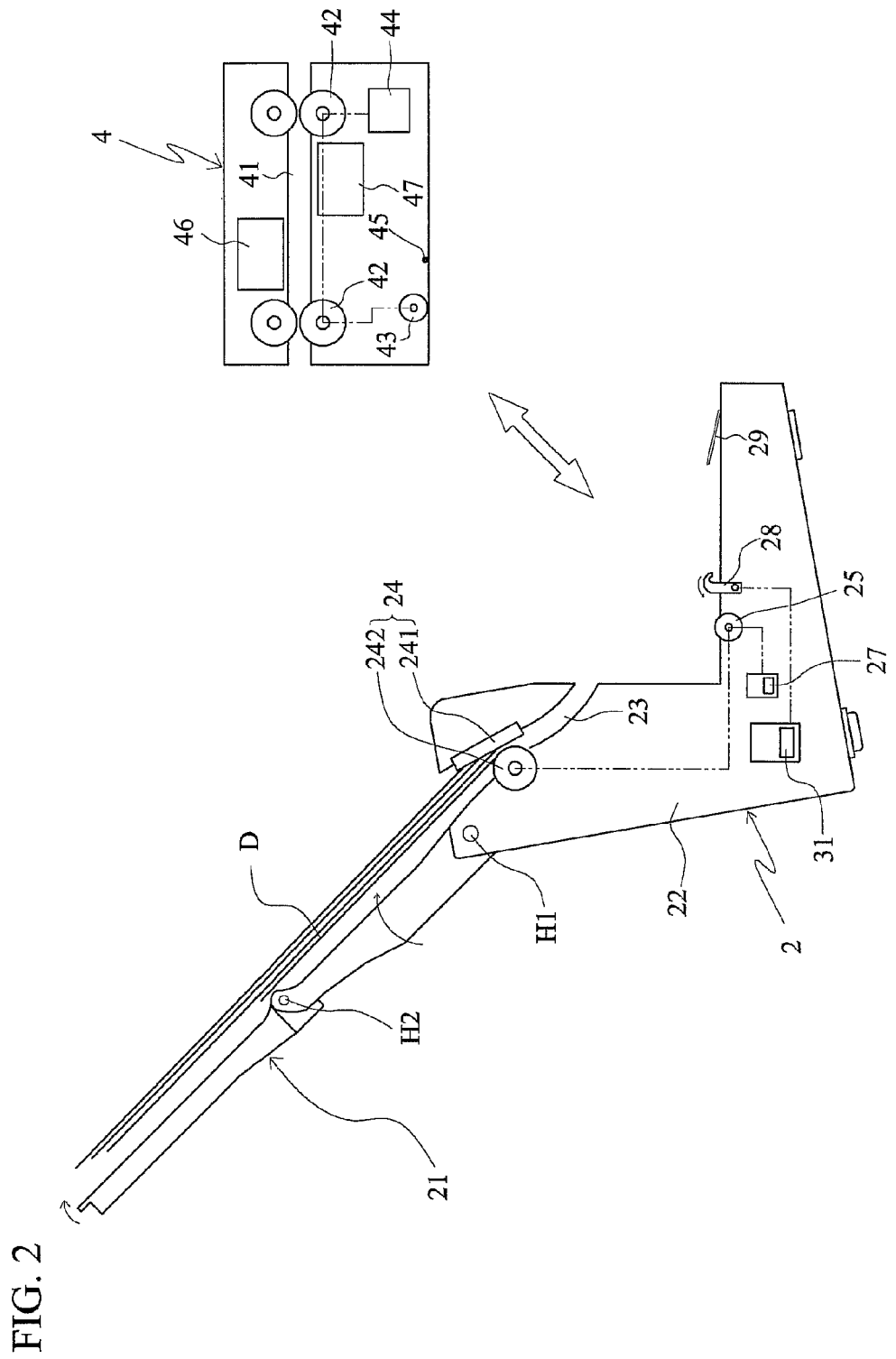
FIG. 2 is a schematic illustration showing the automatic image processing apparatus of FIG. 1 disassembled.

FIG. 1 is a schematic illustration showing an automatic image processing apparatus 1 according to a first embodiment of the invention. FIG. 2 is a schematic illustration showing the automatic image processing apparatus of FIG. 1 disassembled. As shown in FIGS. 1 and 2, the automatic image processing apparatus of the invention may be a scanner apparatus or a printer apparatus. In the following, the scanner apparatus is described as an example.

Referring to FIGS. 1 and 2, the automatic image processing apparatus 1 according to the first embodiment of the invention includes a sheet feeding device 2 and an image processing device 4. The sheet feeding device 2 supports a plurality of sheets D, and feeds the sheets D one by one. The sheet feeding device 2 includes a supplying tray 21, a base 22, a feeding mechanism 24 and a mechanical power receiving part 25.

The supplying tray 21 is stored in the sheets D. In order to make the supplying tray 21 be extended and retracted, the supplying tray 21 is pivotally connected to the base 22 by two hinges H1 and H2.

The base 22 is formed with a first passageway 23 connected to the supplying tray 21. The first passageway 23 is defined by a number of guide plates.

The feeding mechanism 24 mounted on the base 22 feeds the sheets D through the first passageway 23 one by one. The feeding mechanism 24 includes a frictional element (such as a friction pad) 241 and a separation roller 242. The friction pad 241 is disposed on the base 22. The separation roller 242 is disposed opposite the friction pad 241 and is driven by the mechanical power receiving part 25 to rotate. The rotating separation roller 242 and the friction pad 241 cooperate with each other so that the sheets can be separated to prevent multiple sheets from being simultaneously fed into the first passageway 23.

The mechanical power receiving part 25, disposed in the base 22 and coupling the image processing device to the feeding mechanism 24, receives mechanical power from the image processing device 4 and thus drives the feeding mechanism 24. In this embodiment, the mechanical power receiving part 25 includes a gear set, which transmits the mechanical power and drives the feeding mechanism 24. When the sheet feeding device 2 is removed from the image processing device 4, as shown in FIG. 2, the mechanical power for feeding the sheets D is disconnected from the sheet feeding device 2. In other embodiments, the mechanical power receiving part 25 may be other power transmission elements, such as a roller, a pulley, a belt or a coupler.

The image processing device 4 receives the sheets D coming from the sheet feeding device 2 one by one, and feeds and processes the sheets D one by one. The sheet feeding device 2 is removably connected to the image processing device 4, and receives the mechanical power from the image processing device 4 to feed the sheets D one by one.

The image processing device 4 may be a scanner for acquiring the images of the sheets D, or a printer for printing data on the sheets D. Thus, the image processing device 4 may include a second passageway 41, a transporting mechanism 42, a mechanical power output part 43, a power source 44, a first scanning module 46 and a second scanning module 47. When the image processing device 4 is used as a stand-alone device, the user has to manually place a sheet into the second passageway 41 of the image processing device 4 so that the sheet is clamped by the transporting mechanism 42 and then the sheet may be processed.

The second passageway 41 guides the sheet D coming from the first passageway 23. The transporting mechanism 42 is usually composed of several rollers and transports the sheets coming from the first passageway 23 through the second passageway 41. The mechanical power output part 43, which may be a power transmission element, such as a gear, a roller, a belt, a pulley or a coupler, outputs the mechanical power to the mechanical power receiving part 25.

The power source 44 is coupled to the mechanical power output part 43 to drive the mechanical power output part 43. The power source 44 usually comprises a motor, which includes, without limitation to, a DC motor or a stepping motor. The power source 44 may be further coupled to the transporting mechanism 42 for driving the transporting mechanism 42. The mechanical power output part 43, such as the gear, may mesh with the mechanical power receiving part 25, which also include another gear, so that the mechanical power may be transmitted to the sheet feeding device 2.

The sheet feeding device 2 may further include a power switching mechanism 27, a locking mechanism 28 and an elastic force providing mechanism 29. The power switching mechanism 27, disposed in the base 22 and connected to the mechanical power receiving part 25, selectively connects and disconnects the mechanical power receiving part 25 to and from the mechanical power of the image processing device 4. The user can control the power switching mechanism 27 to achieve the function of switching on and off the mechanical power supplied to the sheet feeding device 2. For example, the power switching mechanism 27 can switch the position of the mechanical power receiving part 25 to separate the mechanical power receiving part 25 from the mechanical power output part 43. Consequently, the image processing device 4 cannot transmit the power to the sheet feeding device 2. The locking mechanism 28 mounted on the base 22 links with a locking part 45 of the image processing device 4 and secures the image processing device 4 to the sheet feeding device 2 to prevent the image processing device 4 from being separated from the sheet feeding device 2. In this embodiment, the locking mechanism 28 may be controlled by an actuator 31, and the user can control the actuator 31 to separate the image processing device 4 from the sheet feeding device 2.

The elastic force providing mechanism 29 mounted on the base 22 provides an elastic force to push the image processing device 4 to make the locking mechanism 28 secure the image processing device 4 tightly to the sheet feeding device 2. The elastic force providing mechanism 29 is a plate-like spring and also may be any other type of spring.

The first scanning module 46 disposed on one side of the second passageway 41 scans an image of a front side of the sheet D transported through the second passageway 41. The first scanning module 46 may also be replaced by a first printing module for printing data on the sheet.

The second scanning module 47 disposed on the other side of the second passageway 41 scans an image of a backside of the sheet D transported through the second passageway 41. The second scanning module 47 may also be replaced by a second printing module for printing data on the sheet.

Thus, the automatic image processing apparatus may include a single scanning module, a single printing module, two scanning modules, two printing modules, or a scanning module and a printing module. The scanning module and the printing module may be disposed on the same side or opposite sides of the second passageway.

Figure 3:
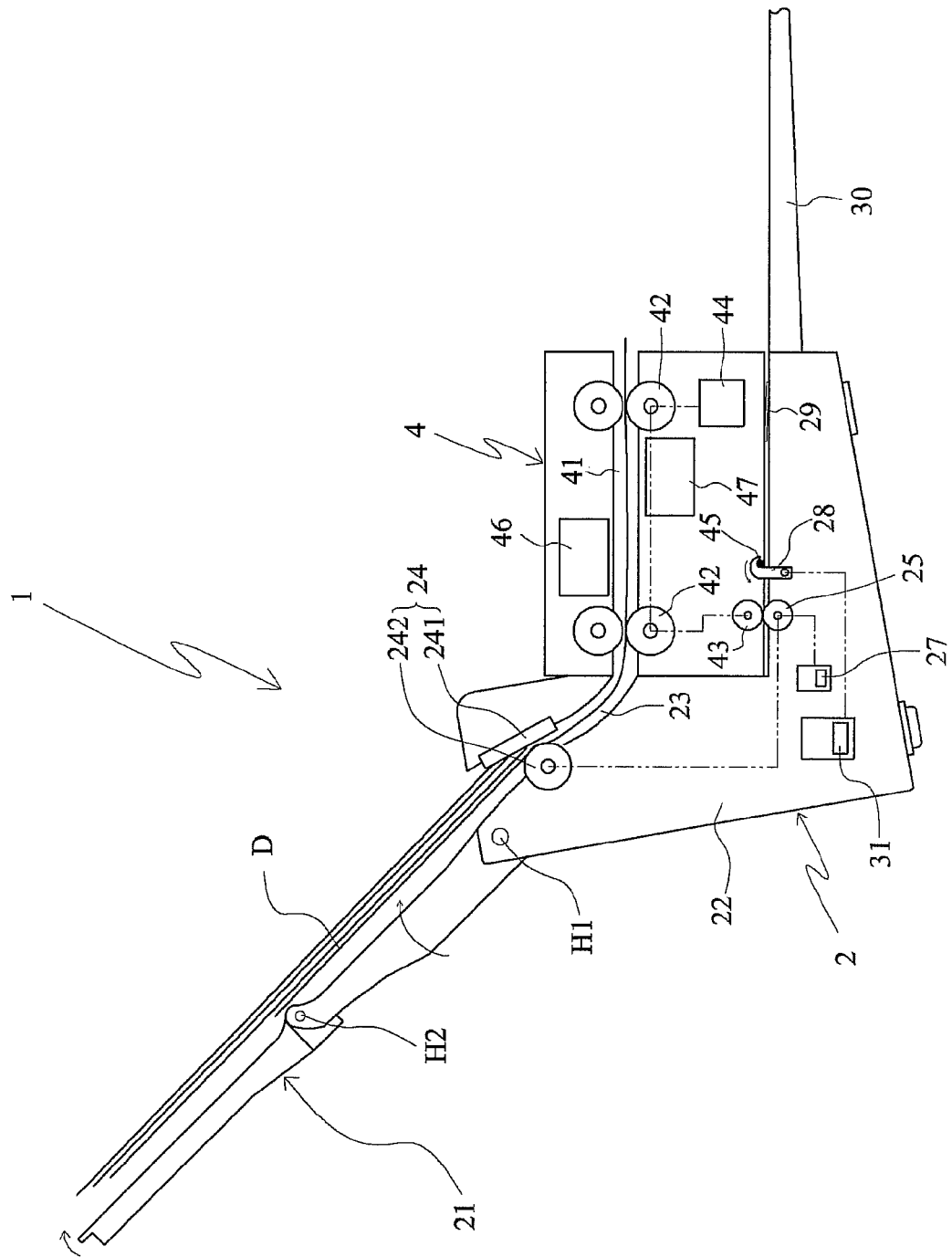
FIG. 3 is a schematic illustration showing an automatic image processing apparatus according to a second embodiment of the invention.

FIG. 3 is a schematic illustration showing an automatic image processing apparatus according to a second embodiment of the invention. Referring to FIG. 3, the automatic image processing apparatus 1 may further include a discharging tray 30, attached to the sheet feeding device 2, for storing the sheets D coming from the image processing device 4.

Figure 4:
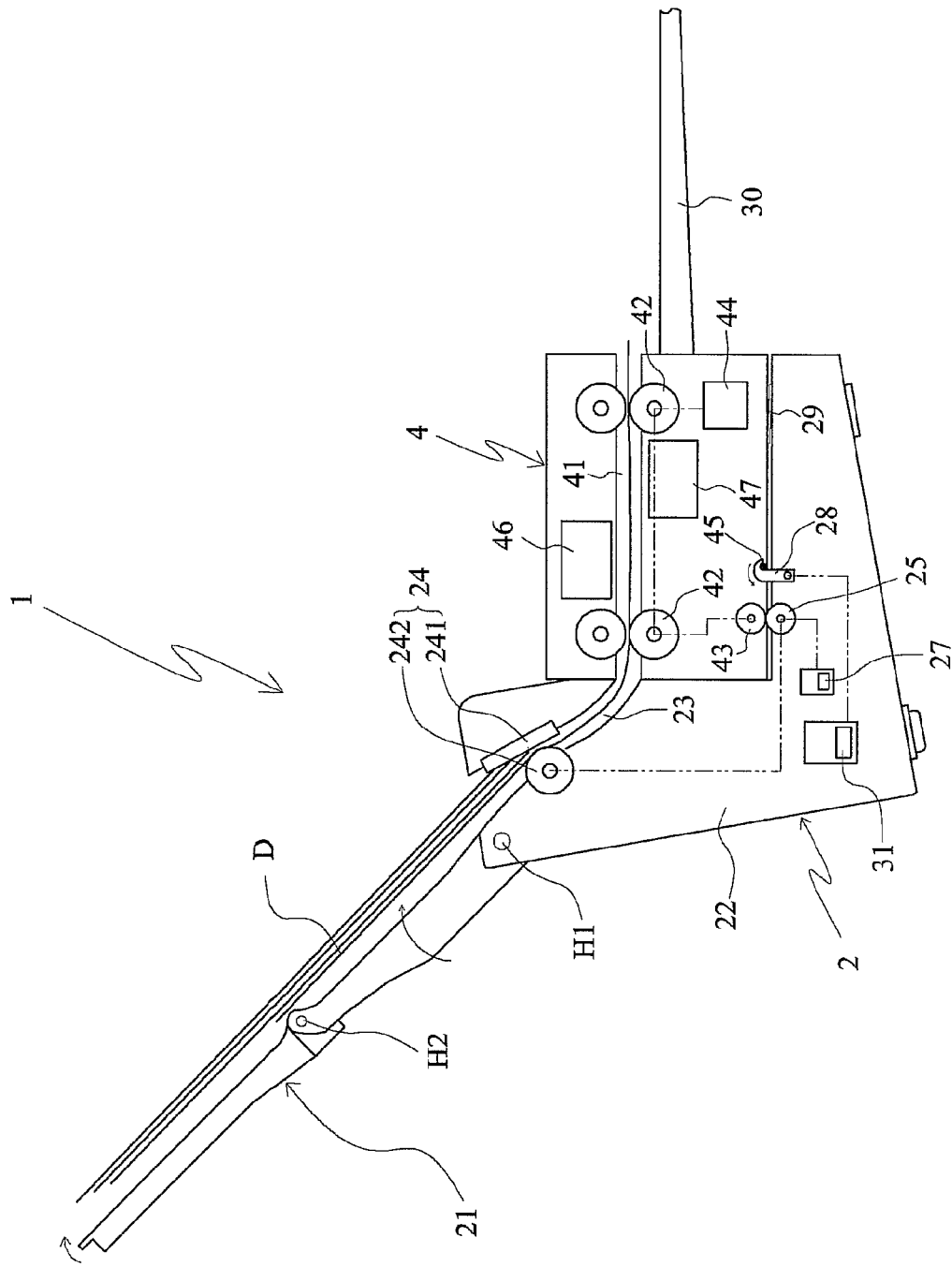
FIG. 4 is a schematic illustration showing an automatic image processing apparatus according to a third embodiment of the invention.

FIG. 4 is a schematic illustration showing an automatic image processing apparatus according to a third embodiment of the invention. Referring to FIG. 4, the automatic image processing apparatus 1 may further include a discharging tray 30, attached to the image processing device 4, for storing the sheets D coming from the image processing device 4.

According to the automatic image processing apparatus and the sheet feeding device thereof, the user can easily combine the sheet feeding device with the image processing device or separate the sheet feeding device from the image processing device. The image processing device can process image data (e.g., scan the image of the sheet or print data on the sheet) by way of manual sheet feeding. When the image processing device is combined with the sheet feeding device, the user can quickly process the images of a stack of the sheets stored in the supplying tray by way of automatic sheet feeding. In addition, the feeding mechanism is driven by the mechanical power of the image processing device, so no motor for providing the mechanical power has to be disposed in the sheet feeding device.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An automatic image processing apparatus, comprising:
   a sheet feeding device for supporting a plurality of sheets and feeding the sheets one by one; and
   an image processing device for receiving the sheets coming from the sheet feeding device one by one, and transporting and processing the sheets one by one, wherein the sheet feeding device is removably connected to the image processing device, and the sheet feeding device receives mechanical power from the image processing device to feed the sheets one by one, and the mechanical power for feeding the sheets is disconnected from the sheet feeding device when the sheet feeding device is removed from the image processing device.

2. The automatic image processing apparatus according to claim 1, wherein the sheet feeding device comprises:
   a supplying tray for storing the sheets;
   a base formed with a first passageway connected to the supplying tray;
   a feeding mechanism, mounted on the base, for feeding the sheets through the first passageway one by one; and
   a mechanical power receiving part, disposed in the base and coupling the image processing device to the feeding mechanism, for receiving the mechanical power from the image processing device and thus driving the feeding mechanism.

3. The automatic image processing apparatus according to claim 2, wherein the sheet feeding device further comprises:
   a power switching mechanism, disposed in the base and connected to the mechanical power receiving part, for selectively connecting and disconnecting the mechanical power receiving part to and from the mechanical power of the image processing device.

4. The automatic image processing apparatus according to claim 2, wherein the sheet feeding device further comprises:
   a locking mechanism, mounted on the base, for linking with a locking part of the image processing device and securing the image processing device to the sheet feeding device.

5. The automatic image processing apparatus according to claim 4, wherein the sheet feeding device further comprises:
   an elastic force providing mechanism, mounted on the base, for providing an elastic force to push the image processing device to make the locking mechanism secure the image processing device tightly to the sheet feeding device.

6. The automatic image processing apparatus according to claim 2, wherein the supplying tray is pivotally connected to the base.

7. The automatic image processing apparatus according to claim 2, wherein the mechanical power receiving part comprises a gear set which drives the feeding mechanism.

8. The automatic image processing apparatus according to claim 2, wherein the feeding mechanism comprises:
   a frictional element disposed on the base; and
   a separation roller, which is disposed opposite the frictional element and is driven by the mechanical power receiving part to rotate.

9. The automatic image processing apparatus according to claim 2, further comprising:
   a discharging tray, attached to the sheet feeding device, for storing the sheets coming from the image processing device.

10. The automatic image processing apparatus according to claim 2, wherein the image processing device comprises:
    a second passageway;
    a transporting mechanism, for transporting the sheets coming from the first passageway through the second passageway; and
    a mechanical power output part for outputting the mechanical power to the mechanical power receiving part.

11. The automatic image processing apparatus according to claim 10, wherein the image processing device further comprises:
    a power source, coupled to the mechanical power output part, for driving the mechanical power output part.

12. The automatic image processing apparatus according to claim 11, wherein the power source is further coupled to the transporting mechanism for driving the transporting mechanism.

13. The automatic image processing apparatus according to claim 10, wherein the image processing device comprises:
    a first scanning module, disposed on one side of the second passageway, for scanning an image of a front side of the sheet transported through the second passageway.

14. The automatic image processing apparatus according to claim 13, wherein the image processing device further comprises:
    a second scanning module, disposed on the other side of the second passageway, for scanning an image of a backside of the sheet transported through the second passageway.

15. The automatic image processing apparatus according to claim 10, wherein the image processing device comprises:
    a printing module, disposed on one side of the second passageway, for printing data on the sheet transported through the second passageway.

16. A sheet feeding device to be removably connected to an image processing device, the sheet feeding device comprising:
    a supplying tray for storing a plurality of sheets;
    a base formed with a first passageway connected to the supplying tray;
    a feeding mechanism, mounted on the base, for feeding the sheets through the first passageway one by one; and
    a mechanical power receiving part, disposed in the base and coupling the image processing device to the feeding mechanism, for receiving mechanical power from the image processing device and thus driving the feeding mechanism, wherein the mechanical power for feeding the sheets is disconnected from the sheet feeding device when the sheet feeding device is removed from the image processing device.

17. The sheet feeding device according to claim 16, further comprising:
    a power switching mechanism, disposed in the base and connected to the mechanical power receiving part, for selectively connecting and disconnecting the mechanical power receiving part to and from the mechanical power of the image processing device.

18. The sheet feeding device according to claim 17, further comprising:
  a locking mechanism, mounted on the base, for linking with a locking part of the image processing device and securing the image processing device to the sheet feeding device.

19. The sheet feeding device according to claim 18, further comprising:
  an elastic force providing mechanism, mounted on the base, for providing an elastic force to push the image processing device to make the locking mechanism secure the image processing device tightly to the sheet feeding device.

20. The sheet feeding device according to claim 16, wherein the supplying tray is pivotally connected to the base.

21. The sheet feeding device according to claim 16, wherein the mechanical power receiving part comprises a gear set which drives the feeding mechanism.

22. The sheet feeding device according to claim 16, wherein the feeding mechanism comprises:
  a frictional element disposed on the base; and
  a separation roller, which is disposed opposite the frictional element and is driven by the mechanical power receiving part to rotate.

23. The sheet feeding device according to claim 16, further comprising:
  a discharging tray, attached to the sheet feeding device, for storing the sheets coming from the supplying tray.

* * * * *